Aug. 28, 1951     E. M. BRADBURD     2,565,469
DELAY LINE TERMINATION
Filed Feb. 2, 1949
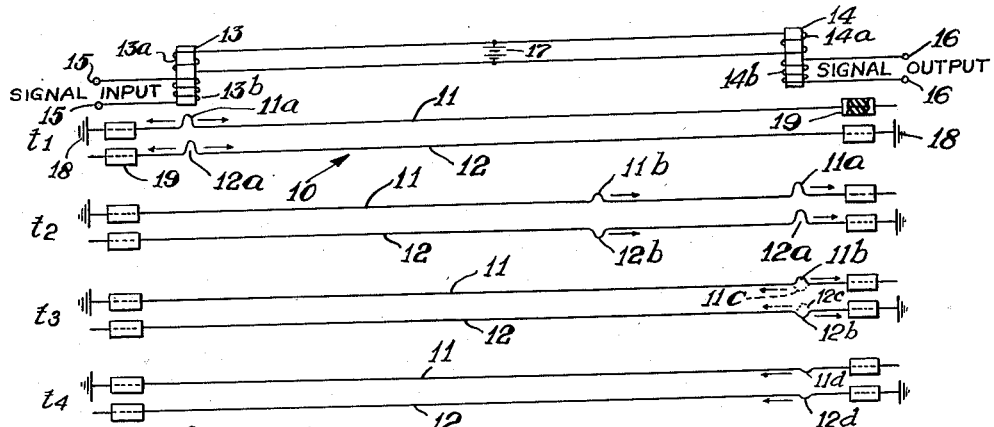
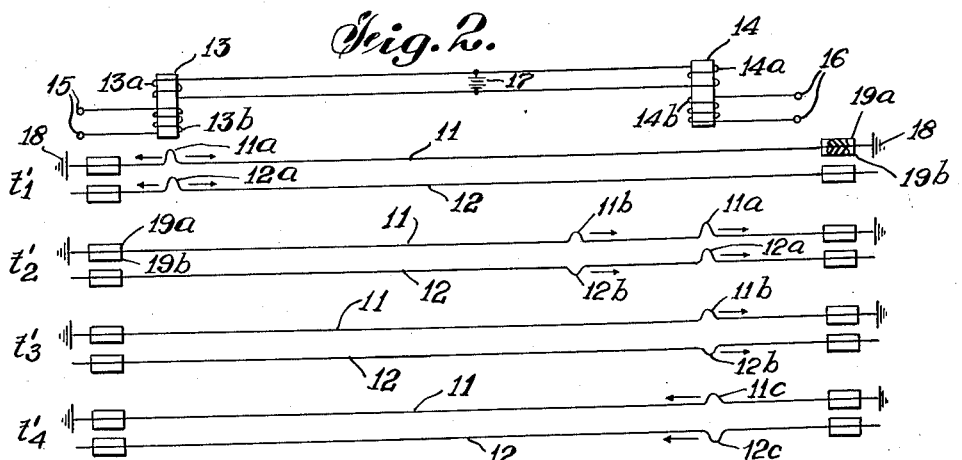
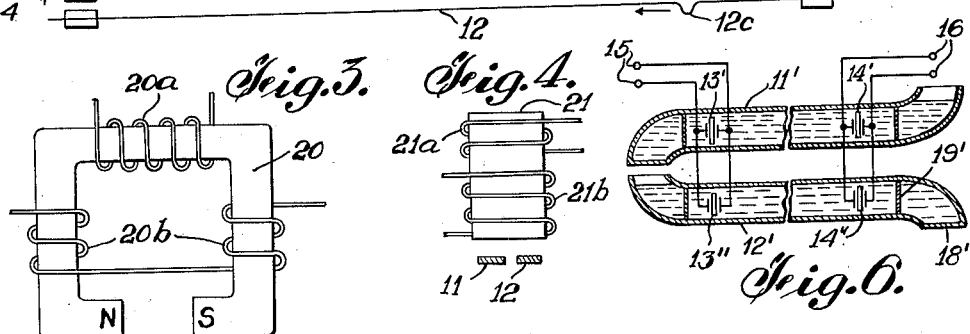
INVENTOR.
ERVIN M. BRADBURD
BY
ATTORNEY Patented Aug. 28, 1951

2,565,469

UNITED STATES PATENT OFFICE 2,565,469

DELAY LINE TERMINATION

Ervin Murray Bradburd, Fairlawn, N. J., assignor to International Standard Electric Corporation, New York, N. Y., a corporation of Delaware Application February 2, 1949, Serial No. 74,223

16 Claims. (Cl. 178—44)

The present invention relates to mechanical pulse delay means using sonic or supersonic delay lines such as, for example, liquid or magnetostrictive delay lines.

The termination of mechanical delay lines to prevent the occurrence of troublesome echo pulses has always presented difficulties. In magnetostrictive delay lines, for example, signal pulses generated by a transmitter coil will be reflected at both ends of the line, so that a receiver coil spaced from the transmitter coil will pick up two different echo pulses due to a single input pulse.

It is an object of the present invention to provide, in a system for delaying mechanical pulses by means of a sonic or supersonic delay line, means for preventing interference by first-order echo pulses, i. e. echo pulses due to a single reflection. The invention also provides means for substantially reducing the magnitude of echo pulses of a higher order, i. e. due to two or more reflections.

Broadly speaking, the invention provides pulse delay means comprising one or more mechanical delay lines terminated at opposite ends in such manner that a pulse, injected at a suitable input location, will give rise to a plurality of first-order echo pulses of similar magnitude and opposite sign which substantially cancel at a suitable output location.

According to a more specific aspect of the invention there may be provided, in a system of the character described, pulse delay means comprising a pair of sonic or supersonic delay lines, means for exciting the two lines in parallel so that a signal pulse will be set up in each of them, and means for simultaneously picking up said pulses after a predetermined delay, an end of one line terminating in a substantially infinite impedance, the corresponding end of the other line terminating in substantially zero impedance, the respective distances between said pick-up means and said ends being selected so that the echoes of signal pulses reflected at said ends will arrive at said pick-up means simultaneously.

Where, as in the case of a magnetostrictive delay line, the exciting means is spaced from the input end of the line so that reflection is apt to occur at both ends, the pair of delay lines is preferably terminated at both ends in the manner described. In order substantially to suppress echo pulses of a higher order with such an arrangement, suitable damping means may be inserted between the exciting and pick-up means on one hand and the input and output end, respectively, on the other; such damping means may, in the case of a magnetostrictive delay line, take the form of rubber damping cells or pads.

The invention will be better understood from the following detailed description, reference being had to the accompanying drawings in which:

Fig. 1 schematically illustrates the mode of operation of one embodiment of the invention;

Fig. 2 schematically illustrates the mode of operation of another embodiment of the invention;

Figs. 3, 4 and 5 show different forms of practical realization of the invention; and Fig. 6 illustrates the application of the invention to liquid delay lines.

Referring to Fig. 1, there is shown diagrammatically a delay device 10 comprising a pair of parallel magnetostrictive delay lines 11, 12, for example nickel ribbons, selected to have substantially identical pulse transmission characteristics. An exciting or transmitter coil 13 and a pick-up or receiver coil 14 are positioned adjacent the input and output end, respectively, of the device 10. Each coil has a polarizing or biasing winding 13a, 14a, coil 13 being further provided with an exciting winding 13b, connected across signal input terminals 15, and coil 14 with a pick-up winding 14b, connected across signal output terminals 16. A source of biasing current, indicated at 17, is shown connected across both windings 13a, 14a in parallel.

According to the invention, an end of one line (e. g. the output end of line 12) is terminated in a substantially infinite impedance such as a clamp or other rigid anchorage indicated here schematically at 18, and the corresponding end of the other line (line 11) is left free, thus having substantially infinite compliance or zero impedance. Similarly, the input end of line 11 is terminated in an anchorage 18 while the input end of line 12 is left free.

A rubber cell 19 is provided adjacent each end of each delay line, the rubber cell serving as a damping means with the extremity of the line passing through it. It will be evident that pairs of rubber pads could have been used instead, each extremity of a line being inserted between the two pads of a pair.

When a current impulse passes through the winding 13b, a signal pulse 11a will appear in the line 11 and a similar pulse 12a will be generated in the line 12. The time of occurrence of the original impulse has been designated $t_1$. The two pulses will propagate themselves in both directions, as indicated by the arrows, at a speed determined by the transmission characteristics of the two lines, these characteristics depending on the cross section of each line and being assumed to be equal for both lines.

At a time $t_2$, the pulses $11a$, $12a$ will have traveled toward the right (as viewed in the drawing) for a sufficient distance to pass below the pick-up coil 14, causing a current impulse to be induced in the winding $14b$ of the latter.

It will be noted that the two pulses $11a$, $12a$ have remained in phase while traveling from one coil to the other, thus reinforcing each other in their effect upon coil 14. The original signal pulse will, however, also have traveled toward the left where, as the result of deflection at the input end of the two lines, they will have given rise to two echo pulses $11b$, $12b$, respectively. Pulse $11b$, being the result of a reflection at a high-impedance termination, will be of the same phase as the original pulse $11a$; pulse $12b$, being the result of a reflection at low-impedance termination, will be of a phase opposite to that of the original pulse $12a$. Hence, the two pulses, when they pass below the receiver coil 14 at time $t_3$, will cancel out and will not give rise to a spurious current impulse in winding $14b$. It will also be noted that the amplitude of echo pulses $11b$, $12b$ is considerably less than that of signal pulses $11a$, $12a$, as the result of two traversals of the damping means 19.

Where the distance between the transmitter coil 13 and the input end is the same as the distance between the receiver coil 14 and the output end, another pair of echo pulses $11c$, $12c$ will pass below coil 14 simultaneously with echo pulses $11b$, $12b$; pulses $11c$, $12c$ are the result of reflection at the output end of lines 11, 12 and are inverted with respect to pulses $11b$, $12b$, respectively, hence the two pairs of echo pulses will cancel. This cancellation is in addition to the neutralization provided by the two parallel lines and results from the fact that the two ends of a line terminate in a high and a low impedance, respectively.

After a second reflection at the output end of the system 10, another pair of echo pulses $11d$, $12d$ will pass at the time $t_4$ below pick-up coil 14. These latter pulses are in phase, as shown, but are each of very reduced amplitude as a result of four traversals of the damping means 19. The parasitic current impulse induced in the winding $14b$ will, therefore, be practically without significance.

Fig. 2 illustrates an arrangement in which the spacing from the adjacent end of the lines is different for each coil. The same elements have been used as in Fig. 1, being indicated by the same reference numerals except that each damping cell 19 has been replaced by a pair of pads $19a$, $19b$ as previously set forth. The arrangement differs from that described above in that line 11 is shown provided herein with two high-impedance terminals 18 while the two ends of line 12 are free.

At times $t_1'$ and $t_2'$, conditions are similar to those at times $t_1$ and $t_2$, respectively, in Fig. 1. Echo pulses $11b$, $12b$ and $11c$, $12c$ will appear at different times $t_3'$ and $t_4'$, respectively, because of the different spacing of coils 13, 14 from the ends of the two lines. It will also be noted that the phase of pulse $11c$ will be the same as that of pulse $11b$, and this is also true of pulses $12c$ and $12b$. Mutual cancellation of times $t_3'$ and $t_4'$ is, however, assured by virtue of the resultant relative inversion of the pulses in the two lines 11 and 12.

It will be appreciated that the illustration of Figs. 1 and 2 is strictly schematical and that, in practice, the relationship between the two lines 11, 12 and each coil 13, 14 should be chosen so as to insure the same degree of cooperation between each line and either of these coils. One such arrangement is shown in Fig. 3 wherein the lines 11, 12, shown here as ribbons of rectangular cross section, are disposed intermediate the poles of a horseshoe-shaped magnet core 20 carrying a biasing winding $20a$ and a signal winding $20b$ which may correspond to either the exciting winding $13b$ or the pick-up winding $14b$. Another arrangement is shown in Fig. 4, comprising a bar-shaped core 21 carrying a biasing winding $21a$ and a signal winding $21b$, the ribbons 11, 12 being disposed adjacent one end of the core 21.

The arrangements of Figs. 3 and 4 will result in the generation of transverse pulses and, for an easier understanding of the invention, pulses of the latter type have been used in the illustrations of Figs. 1 and 2. It should, however, be understood that the same reasoning applies to longitudinal pulses which can be generated in the ribbons 11, 12 and picked up by an arrangement such as shown, by way of example, in Fig. 5. In this arrangement a signal winding 22 is coiled about the two lines 11, 12 while polarization is obtained from the poles $23a$, $23b$ of a permanent magnet (otherwise not shown). As in the case of Figs. 3 and 4, the arrangement of Fig. 5 can be used as a receiving or as a transmitting device.

In Fig. 6 the magnetostrictive delay lines 11, 12 have been replaced by a pair of liquid delay lines $11'$, $12'$. Each line has one open end, offering negligible impedance to shock waves set up in the liquid, and is provided with closure means $18'$ at the other end to make the impedance there very high. Exciting means are provided in the form of a pair of piezo-electric crystals $13'$, $13''$, connected across input terminals 15, and pick-up means are represented by another pair of piezo-electric crystals $14'$, $14''$ connected across output terminals 16. The system also includes damping means in the form of flexible membranes or diaphragms $19'$ which may be perforated or not, as desired.

The operation of the system of Fig. 6 is completely analogous to that of Fig. 1 and will be understood without further explanation.

The invention is not limited to the forms specifically described and illustrated, but on the contrary, may be modified in various ways without exceeding its scope; for example, certain advantages may already be realized by the use of a single delay line terminated as illustrated in Fig. 1, as will be clear from the foregoing description. It may be mentioned that the arrangement shown in Fig. 1, wherein each line has one free end, is preferred over that of Fig. 2 because, in the latter case, changes in ambient temperature may affect the tension of the two lines or ribbons to a different extent, hence resulting in a different magnitude of signal in the two lines. However, the arrangement such as shown in Fig. 2 will be perfectly workable where conditions are stable and predeterminable.

What is claimed is:

1. A pulse delay system, comprising a pair of mechanical delay lines each having input and an output ends, terminating means at the input end of one line and the output end of said other line having substantially zero impedance, the other ends of said lines being terminated in substantially zero impedance, input means for generating a signal pulse in said lines, and output means for picking up a delayed signal pulse from said lines, said output means being positioned with respect to said ends at a location such that the echoes of signal pulses reflected at said ends will arrive at said output means simultaneously.

2. The system according to claim 1, further including damping means inserted in said lines disposed intermediate each of said ends and said input and said output means respectively.

3. The combination according to claim 1 wherein said delay lines are of the magnetostrictive type.

4. The combination according to claim 1 wherein said delay lines are of the liquid type.

5. A pulse delay system, comprising a first mechanical delay line, a second mechanical delay line, input means for exciting said two lines in parallel so that a signal pulse will be set up in each of said lines, output means for simultaneously picking up said pulses after a predetermined delay, and terminating means at one end of said first line having a substantially infinite impedance, the corresponding end of the second line terminating in substantially zero impedance, whereby reflected echo signals in said two lines will be of opposite phase, said output means being positioned with respect to said ends at a location such that the echoes of signal pulses reflected at said ends will arrive at said output means simultaneously.

6. The system according to claim 5 wherein said two lines are of the same length and substantially identical transmission characteristics.

7. A pulse delay device comprising a pair of mechanical delay lines each having an input and an output end, transmitter means adjacent said input ends, said transmitter means being adapted to set up a signal pulse in each of said lines, receiver means adjacent said output ends, said receiver means being adapted to pick up the signal pulse set up in each line after an interval which is equal for both pulses, and terminating means at one of said input ends and at one of said output ends having a substantially infinite impedance, the other of said input ends and the other of said output ends terminating in substantially zero impedance, said receiver means being located at such distances from said input ends and from said output ends that echoes of signal pulses reflected at corresponding ends will arrive at said receiver means simultaneously.

8. A device according to claim 7, further comprising damping means inserted in each line between said transmitter and receiver means on one hand and the respectively adjacent ends on the other.

9. A device according to claim 8 wherein said damping means comprise a resilient element in engagement with each extremity of said lines.

10. A pulse delay device comprising a pair of parallel and co-extensive ribbons of magnetic material, said ribbons having substantially identical pulse transmission characteristics, a transmitter coil adjacent said ribbons and adapted to induce signal pulses therein, a receiver coil adjacent said ribbons in spaced-apart relation to said transmitter coil and adapted to pick up delayed signal pulses from said ribbons, first anchor means rigidly engaging one end of one of said ribbons, and second anchor means rigidly engaging the opposite end of the other of said ribbons, the remaining ends of said ribbons being freely movable.

11. A pulse delay device according to claim 10, further comprising damping means inserted between each coil and the respectively adjacent end of each of said ribbons.

12. A pulse delay device according to claim 11 wherein said damping means comprise a resilient element in contact with each extremity of said ribbons.

13. A pulse delay device comprising a pair of parallel and co-extensive liquid delay lines having substantially identical pulse transmission characteristics, piezo-electric input means inserted in both of said lines and adapted to induce signal pulses in said lines, piezo-electric output means inserted in both of said lines in spaced-apart relation to said input means and adapted to pick up delayed signal pulses from said lines, first circuit means connecting said input means together for simultaneous excitation of said lines, second circuit means connecting said output means together for combining the delayed signal pulses picked up thereby, first closure means terminating one end of one of said lines in a substantially infinite impedance, and second closure means terminating the opposite end of the other of said lines in a substantially infinite impedance, the remaining ends of said lines being open so as to have substantially zero impedance.

14. A pulse delay device according to claim 13, further comprising damping means inserted between each of said piezo-electric means and the respectively adjacent end of each of said lines.

15. A pulse delay device according to claim 14 wherein said damping means comprise a resilient element inserted in each extremity of said lines.

16. A pulse delay system comprising a pair of mechanical delay lines each having an input and an output end, input means for exciting said two lines in parallel so that a signal pulse will be set up in each of said lines, output means for simultaneously picking up said pulses after a predetermined delay, first terminating means at the input end of one of said lines terminating said input end in a substantially infinite impedance, and second terminating means at the output end of the other of said lines terminating said output end in a substantially infinite impedance, the remaining ends of said line terminating in substantially zero impedance.

ERVIN MURRAY BRADBURD.

REFERENCES CITED

The following references are of record in the file of this patent:

UNITED STATES PATENTS

| Number | Name | Date |
| --- | --- | --- |
| 2,455,740 | Curtis | Dec. 7, 1948 |
| 2,461,543 | Gunn | Feb. 15, 1949 |